UNITED STATES PATENT OFFICE.

NICOLAS B. DENNYS, OF SINGAPORE, STRAITS SETTLEMENTS.

COMPOSITION FOR PREVENTING FOULING OF SHIPS' BOTTOMS.

SPECIFICATION forming part of Letters Patent No. 274,888, dated March 27, 1883.

Application filed November 30, 1881. (Specimens.) Patented in England August 29, 1881, No. 3,751; in Straits Settlements August 30, 1881, No. 19; in France September 10, 1881, No. 144,787; in Germany September 11, 1881, No. 39,129, and in Italy September 17, 1881, No. 13,365.

*To all whom it may concern:*

Be it known that I, NICOLAS B. DENNYS, of Singapore, in the Straits Settlements, have invented a new and Improved Composition for Preventing the Fouling of Ships' Bottoms, and for preserving iron, wood, and other materials, of which the following is a specification.

My invention consists in a composition for preserving wood, iron, and other surfaces from the effects of exposure to salt-water, damp or atmospheric influences, and which is especially adapted for preventing the fouling of ships' bottoms.

The materials made use of and the manner of preparation are as follows: I take in the proportion of one hundred-weight of zinc and immerse in a semi-saturated solution of one and a half hundred-weight of sulphate of copper. These materials are allowed to remain together until all chemical action has ceased. The resulting deposit consists mainly of sulphide of copper and oxide of zinc, with small proportions only of metallic copper and metallic zinc; but no more metallic copper should remain than it is impossible to eliminate, as such is strongly objected to by ship-owners and others. With this resulting deposit, after it has been pulverized, triturated, and ground until it assumes the form of a fine powder, I mix what is known in commerce as "bah-nishi," or Chinese varnish, which is the juice of the plant *Elæococcus vernicia*, in the proportion of about three gallons of the juice to one hundred-weight of the powder, which forms a limpid mass that is to be used as paint on the surface to be protected.

The proportions may vary. For instance, a larger quantity of the sulphate of copper may be used, which will make a better coat.

In defining my invention more clearly I would state that I am aware that various copper compounds, as well as copper in the metallic state, have been combined with a liquid vehicle for use as a paint for ships' bottoms. I am also aware of the well-known laboratory reaction of precipitating metallic copper out of a solution of sulphate of copper by means of metallic zinc. My invention, however, does not stop or is not completed with the reaction just mentioned; but after the copper is all deposited a further action takes place, which changes the nature of the materials present, and forms, as I have good reason to believe, sulphide of copper and oxide of zinc, to which my invention is limited.

Having thus fully described my invention, I claim as new and desire to secure by Letters Patent—

The composition for preserving iron, wood, and other surfaces, consisting of a mixture, with Chinese varnish, in or about the proportions specified, of a powder which is mainly composed of sulphide of copper and oxide of zinc, said powder being the pulverized deposit resulting from zinc immersed in a semi-saturated solution of sulphate of copper, substantially as described.

N. B. DENNYS.

Witnesses:
   E. J. NANSON,
      *Singapore, Solicitor.*
   P. I. WOODFORD,
      *Clerk to Rodyk & Davidson,*
         *Solicitors, Singapore.*